Figure 1:
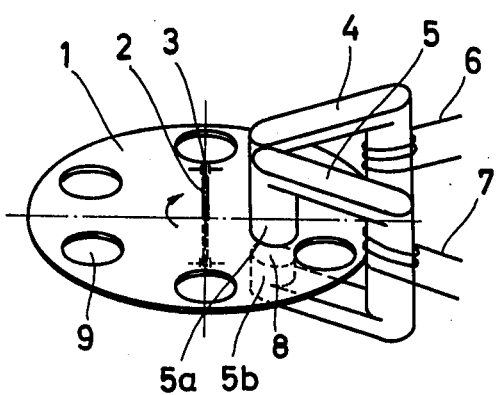

United States Patent [19]

Schunck et al.

[11] 4,155,010

[45] May 15, 1979

[54] PROCESS FOR THE PHOTO-OPTICAL MEASUREMENT OF THE ABSORPTION BEHAVIOR OF SOLID, LIQUID AND GASEOUS MEDIA

[75] Inventors: Günther Schunck; Albert Randow, both of Bruchkobel, Fed. Rep. of Germany

[73] Assignee: Leybold-Heraeus GmbH & Co. KG., Cologne, Fed. Rep. of Germany

[21] Appl. No.: 773,028

[22] Filed: Feb. 28, 1977

[30] Foreign Application Priority Data

Mar. 3, 1976 [DE] Fed. Rep. of Germany ....... 2608669

[51] Int. Cl.² ............................ G01J 1/00; G21F 5/04
[52] U.S. Cl. .................................. 250/343; 250/341; 250/351; 250/514
[58] Field of Search ............... 250/343, 344, 345, 351, 250/514, 510, 341; 310/166, 268; 350/274

[56] References Cited

U.S. PATENT DOCUMENTS

| 1,838,146 | 12/1931 | Klopsteg | 310/268 |
| 3,863,071 | 1/1975 | Campanella | 250/351 |
| 4,048,500 | 9/1977 | Moore | 250/351 |

*Primary Examiner*—Alfred E. Smith
*Assistant Examiner*—Janice A. Howell
*Attorney, Agent, or Firm*—Sprung, Felfe, Horn, Lynch & Kramer

[57] ABSTRACT

Process for the photo-optical measurement of the absorption behavior of solid, liquid and gaseous media. A measurement light beam from an optical radiation source is made intermittent by a rotating chopper comprising a rotatable metal wheel. The chopper frequency is maintained constant by regulation of the speed of the metal wheel by two alternating-current magnets inducing eddy currents to slow or speed up the wheel. The actual speed of the wheel is detected and compared with a reference speed and the magnitude of the excitation currents is adjusted on the basis of the rotatory speed difference to effect the regulation of the speed of the chopper.

6 Claims, 3 Drawing Figures

PROCESS FOR THE PHOTO-OPTICAL MEASUREMENT OF THE ABSORPTION BEHAVIOR OF SOLID, LIQUID AND GASEOUS MEDIA

BACKGROUND

The invention relates to a process for the photo-optical measurement of the absorption behavior of solid, liquid and gaseous media, especially in the photometric analysis of gases by means of infrared rays, by exposing the analysis medium to a measuring light beam made intermittent by a rotating chopping device, the chopper frequency being maintained constant by regulating the speed of the chopping device.

The use of intermittent measuring light beams is common in general in the photo-optical measurement art. Also, the expression, "light modulation," is used, and the devices used for this purpose are called choppers. Light modulation is performed mainly for the purpose of separating the actual measuring signal from signals known as "noise signals," the noise signal being given a much lower frequency than the measuring signal. While the noise signal fluctuates only over relatively long time periods and therefore can be looked upon as a virtually direct-current signal, the chopper frequency is selected on the basis of the measuring device that is being used. For semiconductor detectors it is in the kiloherz range, and for gas detectors using, for example, membrane condensers or anemometers, it is in the range of about 5 Hz with an increasing tendency towards about 500 Hz and over.

The subject of the invention is preferentially applied to the analysis of gas by determining the absorption of an infrared light beam. Such processes and apparatus are the state of the art (German "Auslegeschrift" Nos. 1,296,839 and 1,698,218).

Light choppers or light modulators for photometers are known in numerous versions. In most cases they involve an electric motor on whose shaft there is fastened a chopper wheel provided with openings. The measuring effect at the detector of the photometer is dependent in numerous applications on the chopper frequency, so that usually a synchronous motor is used to drive the chopper. Chopper wheel drives are also known in which the motor is a commutator-less direct-current motor whose rotatory speed is held constant by a regulating system. The rotatory speed information that is used for the regulation is obtained from the voltage of the motor winding. Furthermore, light choppers have been known in which the modulation of the light is produced by a rapidly swinging pendulum or by forks—called tuning forks—which are excited at their natural frequency. Deficiencies of such apparatus are to be found in their physical size and in the fact that, when the chopper wheel is driven by a motor, the beam path is almost always partially in communication with the interior of the motor, which can result in disturbances of the measuring signal due to outgassing effects, especially when the chopper is used in gas analysis apparatus. In a number of known apparatus, the phase signal is derived from the position of the chopper wheel by means of what is known as a rotation indicator, such as for example a photoelectric cell. The phase signal can furthermore also be derived from the drive voltage or, in the case of commutator-less direct-current motors, from the motor winding voltage. Phase rotations, which occur in the detector and in the amplifier that follows the detector, are not taken into consideration in this method and therefore can have an adverse effect on the accuracy of measurement.

Consideration must be given to the fact that the measuring signals which are obtained at the detector in high-resolution photometers, for example, are very small in proportion to the noise signals which always occur, so that phase-controlled rectification must usually be used for the separation of the signals. Generally a high resolution is expected from measuring apparatus of the kind under discussion, i.e., a high response sensitivity to extremely small changes in the specimen concentrations, down to $10^2$ ppm.

An improvement of the evaluation of the measuring signal in non-frequency-dependent detectors can be accomplished by an increase in the chopper frequency. The well-known sensitivity of gas detectors and transducing circuitry to mechanical vibration is decidedly reduced in this manner. At high chopper frequencies, very large diameters are very soon required, since the speed of the motors must be kept relatively low on account of bearing problems and the trouble involved in balancing. Large chopper wheels, however, are undesirable because they militate against compactness.

SUMMARY OF THE INVENTION

The invention is therefore addressed to the problem of improving the above-described process in such a manner that the stated disadvantages will no longer occur, and that even at increased chopper frequency, an extraordinarily high constancy will be achieved with regard to rotatory speed and at the same time with regard to the phasing between the reference signal and the measuring signal, while the construction will remain compact. In particular, the obstacles which have been virtually insurmountable on the basis of the known chopper wheel drives must be overcome.

The solution of the problem is accomplished by the present invention, in the process described in the beginning, in that a rotatable metal wheel serves as the chopper, which is driven by eddy currents between two alternating-current magnets which can be dephased from one another, and that a value representing a comparison of the actual speed of the metal wheel and its required speed is formed and is used as the adjustment magnitude for the changing of the phasing or amplitude ratio, as the case may be, of the magnet excita-currents, on the basis of the speed difference.

Controllable eddy current drives involving a rotatable metal wheel and two alternating current magnets disposed one on either side of the wheel are known, also under the name of "Ferraris drive." The speciality of the subject of the invention lies, however, in the constructional combination of the chopper with a Ferraris drive and in the desirable regulating action of such a combination. By means of the phase shift between the two alternating currents, one element of the drive of the metal wheel can be exercised through the eddy currents, which in the event of a phase shift of +90 degrees produces a torque in one (positive) direction, in the event of a phase shift of 0 degrees produces zero torque, and in the event of a phase shift of −90 degrees produces a torque in the opposite (negative) direction. By continuously changing the phasing between the given values, an extremely sensitive and precise torque or rotatory speed regulation can be achieved. A comparable control can be achieved at constant phasing by a corresponding variation of the amplitudes of the exciting currents from one another, it being possible to obtain a reversal of the sense of rotation or a braking action by means of a negative amplitude of the one exciting current. It is especially advantageous to use an aluminum wheel, which has preferred properties for such eddy current drive systems.

The adjusting magnitude for the variation of the phasing is obtained, in accordance with the invention, from a comparison of the actual speed with a reference speed, an extremely constant reference value being required. As the reference value generator for the reference frequency signal it is desirable to use an oscillator of known construction which in the case of particularly stringent requirements can also be equipped with a quartz crystal oscillator of extreme constancy of frequency. The rotatory speed of the chopper wheel and the chopper frequency are proportional to one another in accordance with the number of apertures in the chopper wheel, so that the desired rotatory speed control will correspond completely to the regulation of the chopper frequency.

The method proposed by the invention combines an extremely simple construction with an extraordinarily precise control of the speed of the metal wheel and with precise maintenance of the phasing between the reference signal and the measurement signal, so that falsification of the reading by the chopper system can no longer occur or will be reduced to a minimum. The volume occupied by the chopper system can be kept extremely small, even in the case of hermetic encapsulation, so that the subject matter of the invention has a very wide range of application.

In accordance with the further invention, an especially simple regulating system is achieved when the value of the actual rotatory speed of the metal wheel is obtained from the signal produced by the absorption characteristic of the medium being analyzed. In this case the rotatory speed signal for the metal wheel is obtained without additional means, even though the signal production is limited to an optical signal. In this manner the phasing of the detector signal is maintained in phase with the reference signal by the regulating circuit. This results in a considerable improvement of the accuracy of measurement, because the phase-controlled rectifier operates with optimum phasing.

It is also possible, however, to obtain an index of the actual speed of the metal wheel independently of the signal indicating the absorption characteristics, and to do so on a digital basis, as for example by means of contacts operated by the shaft of the metal wheel, or rotating magnets, etc. In this manner the wheel speed regulating circuit can be kept independent of the measuring circuit for measuring the medium being analyzed.

It is especially advantageous in this case to provide a trigger circuit, such as a Schmitt trigger circuit for example, between the signal generator and the circuit for comparing the chopper frequency and the reference frequency, whereby the sinusoidal signals of the signal generator or detector, as the case may be, are transformed to square-wave impulses.

It is furthermore advantageous to provide, for the production of the reference frequency signal and of the metal wheel drive frequency, an oscillator whose output frequency is an integral multiple "n" higher than the chopper frequency, and whose output is connected directly to the system for varying the relative phasing and indirectly to the comparator through a frequency divider of a factor of i/n. In this manner a system that is especially insensitive to noise can be achieved, since noise signals from the driving magnet circuits contained in the measuring signal are effectively suppressed by the controlled phase rectification.

For special applications, such as gas analysis for example, the metal wheel can, in accordance with the further invention, be disposed in a wheel-shaped, hermetically sealed chamber which is provided with windows in the path of movement of the apertures for the passage of the measuring light beam, and in which the pole shoes of the alternating current magnets extend through the walls of the chamber to the immediate vicinity of the metal wheel.

Examples of the embodiment of the invention, details thereof, and its manner of operation and other advantages will be described hereinafter with reference to FIGS. 1 to 3.

Figure 2:
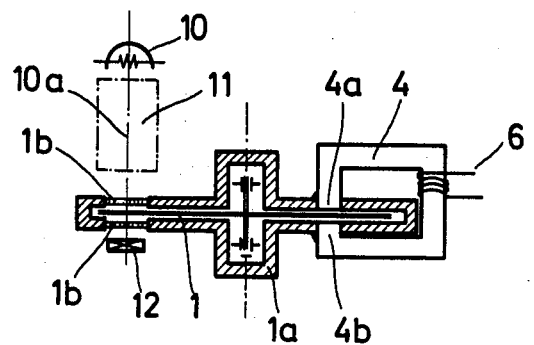
Figure 3:
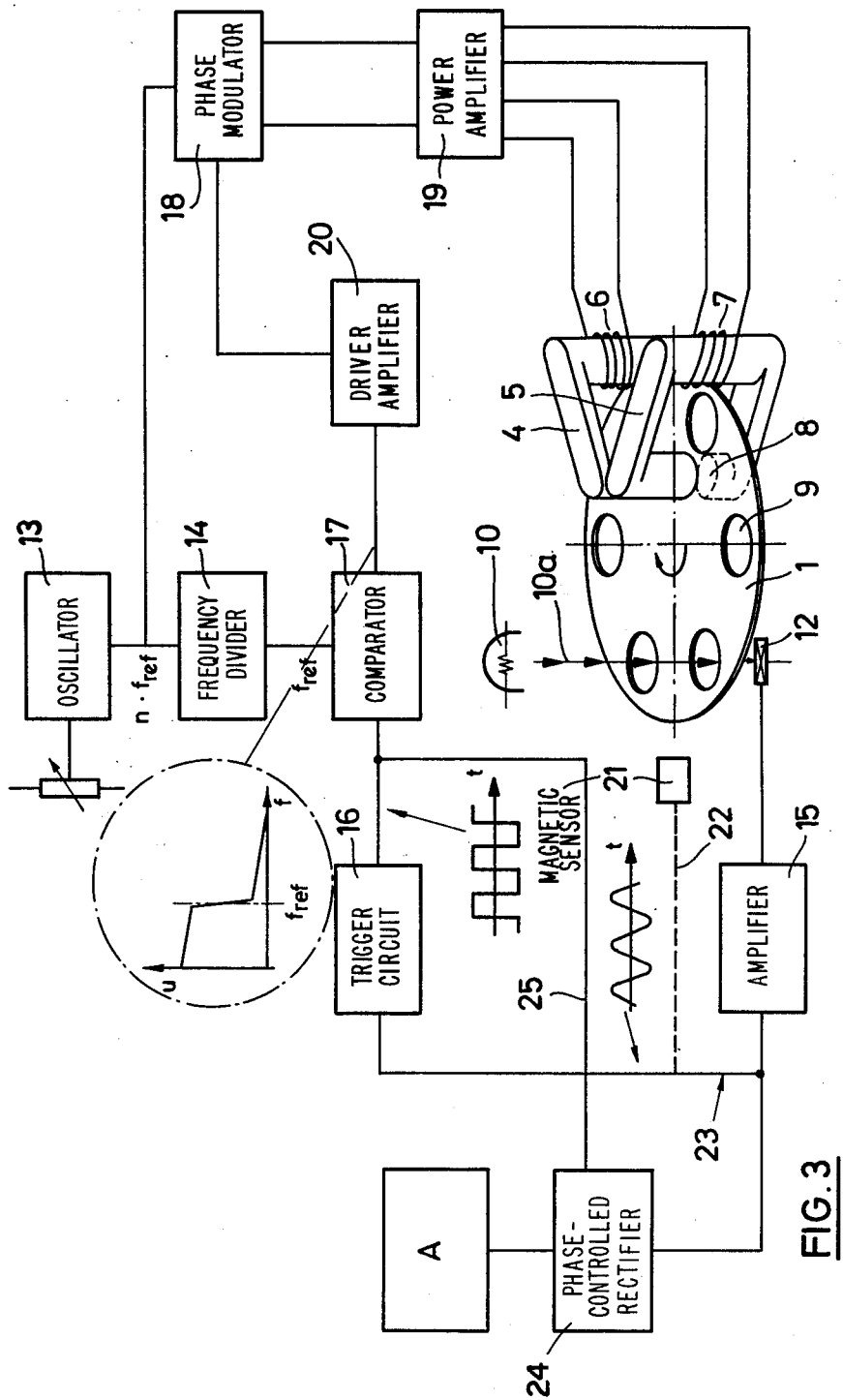

FIG. 1 is a perspective view of an eddy current drive composed of a metal wheel or chopper wheel, and two alternating-current magnets, FIG. 2 is an axial cross section taken through a metal wheel housed in a vacuum chamber and through a corresponding measuring section and through one of the two alternating-current magnets, and FIG. 3 is a perspective view of the subject of FIG. 1 in conjunction with a block circuit diagram of a regulating circuit for regulating the speed of rotation of the metal wheel.

In FIG. 1 there is represented a metal wheel 1 consisting of aluminum, which has a thickness of about 0.5 mm and is affixed to a shaft 2 rotatable in bearings 3 of which only the upper bearing is visible. This bearing is a jeweled bearing of the kind well known in the watchmaking art. A plurality of apertures 9, six for example, are uniformly distributed over the outer margin of the metal wheel 1, which, in conjunction with the portions of the metal wheel between them, produce the actual chopping of the light beam at a frequency which is the product of the revolutions per minute of the wheel and the number of apertures.

The apparatus represented in the drawing is designed for a chopper frequency between, say, 50 Hz and 500 Hz. It can, however, easily be used for very low frequencies of a few Hertz and for high frequencies in the kiloHerz range.

Two alternating-current magnets 4 and 5 are associated with the metal wheel 1, their essential parts being magnet cores which are either low-loss ferrite cores or laminated iron cores. The magnet cores have pole shoes 4a and 4b (FIG. 2) and 5a and 5b, respectively, having an air gap 8 between each pair. On the yoke of each magnet core there is a winding 6 and 7, respectively. The alternating-current magnets 4 and 5 straddle the metal wheel with their pole shoes outside of the axis of rotation of shaft 2 and outside of the path of movement of the apertures 9, the term "outside of the path of movement" referring also and especially to the radial area between shaft 2 and the apertures 9.

To the windings 6 and 7 alternating currents are fed which have a given or variable relative phasing on the basis of the description given above. By the spatial arrangement of the metal wheel 1 and the alternating-current magnets 4 and 5, eddy currents are induced in the wheel, which as described above produce torques by which the metal wheel can be set in rotation and/or slowed.

In FIG. 2, the metal wheel 1 is enveloped by a wheel-shaped chamber 1a whose cross section, as seen in FIG. 2, is adapted substantially to the cross section of wheel 1 including its bearings 3. Chamber 1a is provided in the area of the path of movement of the apertures 9 with windows 1b, on both sides of which a measuring system is provided, which consists of an optical radiation source 10, an absorption section 11 and a detector 12. The absorption section 11 can also be disposed together with the detector 12 underneath the wheel 1. In gas analyzing apparatus the absorption section 11 is generally a measurement cell of known construction. The measuring light beam 10a issuing from the radiation source 10 passes through the medium contained in the absorption section 11 and then enters the detector 12 which is adapted to the special nature of the radiation. The apertures in wheel 11 periodically let the light beam 10a pass through, so that it produces an alternating current on the basis of its pulsating intensity in the radiation detector 12. The pole shoes 4a and 4b, and similarly, of course, the pole shoes 5a and 5b, are brought through the walls of the vacuum chamber 1a into the immediate vicinity of the metal wheel 1, so that the effect described above is produced.

In FIG. 3, parts that are the same as in the preceding figures are given the same reference numbers. The aluminum wheel, which rotates at a speed resulting from the equilibrium between the driving force and friction resistance, is adjusted by means of the regulating system shown to a given rotatory speed. For the production of a reference frequency $f_{ref}$, a controllable oscillator 13 is provided, whose output frequency is an integral multiple "$n \cdot f_{ref}$" of the reference frequency. This frequency is divided by "n" by means of a frequency divider 14, and reduced to the reference frequency "$f_{ref}$". The output frequency "$n \cdot f_{ref}$" of the oscillator 13 results from the optimum drive frequency for the eddy current drive, and in the embodiment here represented it is between 700 Hz and 1500 Hz. In a concrete case, in which a chopper frequency of, say, 215 Hz was desired, the value "n" was taken to be four, so that the eddy current drive frequency was 860 Hz. The drive frequency and the frequency of the chopped light beam, referred to as the chopper frequency, consequently have a fixed ratio to one another which is determined by the value "n" when in the unregulated state. For the regulating process, the detector signal produced by the detector 12 and amplified by an amplifier 15 is fed through a phase-controlled rectifier 24 to an indicating or evaluating apparatus A for the evaluation of the result of the measurement. Parallel thereto, the detector signal, which has the sinusoidal waveform shown, is delivered to a trigger circuit 16, which is a Schmitt trigger circuit for example, and transforms the sinusoidal signal to a series of square waves. These are additionally used for the actuation of the phase-controlled rectifier 24, to which they are delivered through a line 25.

The output of the trigger circuit 16 is delivered, like the output of the frequency divider 14, to a comparator 17 which, in the case of frequency differences between "$f_{ref}$" and the chopper frequency, and in the case of phase differences between "$f_{ref}$" and the measuring signal, which can occur even if the frequencies are the same, is capable of delivering an output signal "u" proportional to the differences, as is represented diagrammatically in the signal diagram shown in the circle connected to the output of the comparator 17. This output voltage "u" is amplified in a driver amplifier 20 and drives a circuit 18, which is a phase modulator, to vary the relative phasing of the exciting currents in the manner described as follows: If "u" is very high, which is equivalent to an excessively low chopper frequency, a high driving force is produced in the eddy current drive by the fact that the exciting currents in windings 6 and 7 are given a phase shift of approximately +90 degrees from one another. If the value of "u" is too low, which is equivalent to an excessively high rotatory speed of the metal wheel 1, the phase modulator shifts the exciting currents in the windings 6 and 7 such that the phase shift amounts to about −90 degrees. In this manner a counterforce is produced by means of the corresponding eddy currents, whereby the metal wheel 1 is slowed. If the chopper frequency is equal to the reference frequency "$f_{ref}$" and no phase shift exists between the two signals, the phase shift of the exciting currents is of such magnitude that precisely the necessary driving torque is produced. In all the regulating processes the exciting currents in windings 6 and 7 are approximately constant, and only their phasing in relation to one another is affected as described above. A power amplifier 19 supplies the current amplification required for the eddy current drive.

The regulating process described above is suitable only for processes in which a usable output signal is produced at the detector even in the case of zero absorption in the absorption section 11 (FIG. 2). This is, however, the case in the arrangement represented.

In the arrangement shown in FIG. 3, the measuring signal produced at the output of the amplifier 15 is simultaneously delivered to the indicating and evaluating circuit A and to the regulating circuit itself. It is also possible, however, to use a signal generator other than the detector 12 for the production of a signal proportional to the rotatory speed of the metal wheel 1, such as, for example, a magnetic sensor 21 which cooperates with magnets in metal wheel 1, which are not shown. In this case the detector signal is delivered to the regulating system via the conductor indicated by the broken line 22 and the original conductor is interrupted at point 23, so that the measuring circuit and the regulating circuit are electrically separate from one another.

What is claimed is:

1. In a process for the photo-optical measurement of the absorption behavior of solid, liquid and gaseous media, especially in the photometric analysis of gases by means of infrared rays of the type including exposing the analysis medium to a measuring light beam made intermittent by rotating chopper means, and maintaining the chopper frequency constant by regulation of the speed of the chopper means, wherein the improvement comprises: providing a rotatable metal wheel with eddy current drive by two alternating-current magnets receptive of excitation currents as the chopper means, comparing the value formed from the actual speed of the metal wheel with a reference speed, and adjusting the magnitude of the excitation currents by variation of the phasing thereof, on the basis of the rotatory speed difference.

2. The process of claim 1, characterized in that the value for the reference speed of the metal wheel is obtained from the measuring signal for the absorption behavior itself.

3. The process of claim 1, characterized in that the value for the reference speed of the metal wheel is obtained independently of the measuring signal for the absorption behavior.

4. In a process for the photo-optical measurement of the absorption behavior of solid, liquid and gaseous media, especially in the photometric analysis of gases by means of infrared rays of the type including exposing the analysis medium to a measuring light beam made intermittent by rotating chopper means, and maintaining the chopper frequency constant by regulation of the speed of the chopper means, wherein the improvement comprises: providing a rotatable metal wheel with eddy current drive by two alternating-current magnets receptive of excitation currents as the chopper means, comparing the value formed from the actual speed of the metal wheel with a reference speed, and adjusting the magnitude of the excitation currents by variation of the amplitude ratio thereof, on the basis of the rotatory speed difference.

5. The process of claim 4, characterized in that the value for the reference speed of the metal wheel is obtained from the measuring signal for the absorption behavior itself.

6. The process of claim 4, characterized in that the value for the reference speed of the metal wheel is obtained independently of the measuring signal for the absorption behavior.

* * * * *